Patented Oct. 31, 1939

2,178,522

UNITED STATES PATENT OFFICE 2,178,522

ALIPHATIC POLYAMINES AND PROCESS OF MAKING THEM

Anderson W. Ralston and Robert J. Vander Wal, Chicago, Ill., assignors to Armour and Company, Chicago, Ill., a corporation of Illinois No Drawing. Application June 6, 1938, Serial No. 212,183

12 Claims. (Cl. 260—583)

This invention relates to aliphatic polyamines and processes of preparing the same, and more particularly to those aliphatic polyamines which result from the hydrogenation of polymerized aliphatic nitriles.

Aliphatic polyamines, and by this we mean aliphatic compounds containing two or more amino groups, are of great technical and scientific interest. Aliphatic polyamines can be condensed with polycarboxylic acids to give plastics. Polyamines are not naturally occurring and their preparation has always been difficult and expensive. They have numerous indicated uses, such as emulsifying agents for oils and fats or for lubricating oils, as plasticizing and modifying agents for resins and various plastic compositions, as detergents and in the insecticide and fungicide field. In view of the numerous potential uses for aliphatic polyamines it is evident that their preparation by a cheap and effective process is highly desirable.

In the Ralston application, Serial No. 92,943, filed July 27, 1936, it has been shown that nitriles, such as stearonitrile, oleonitrile, etc., can be polymerized to give products of high molecular weight. These products are either heavy oils or wax-like solids. This process of polymerization does not destroy the nitrile group of the nitriles and the products which are obtained are polynitriles. When unsaturated nitriles are polymerized the point of attachment is at the olefinic bond and when saturated nitriles are polymerized there appears to be dehydrogenation followed by polymerization so that in either case polymers containing two or more nitrile groups result. This differs from polymerization of unsaturated acids because the carboxyl group is not thermostable and is lost during polymerization by heat in the presence of catalysts. We have now found that these polynitriles can be converted to polyamines by hydrogenation without undergoing depolymerization. The nitrile group, we find, is extremely heat stable, and, consequently, we can hydrogenate the polynitriles at elevated temperatures and pressures in the presence of hydrogenation catalysts to polyamines. Likewise, we have discovered that the polyamines thus formed are heat stable under the hydrogenating conditions so that the products we seek do not decompose as rapidly as formed.

In its broadest aspects our invention comprises products and processes wherein an aliphatic nitrile containing ten or more carbon atoms is polymerized either in the presence or absence of such catalysts as aluminum chloride, zinc chloride, sodium or sulfur to give polynitriles, and such polynitriles are then hydrogenated to give polyamines having two or more amino groups in the molecule.

The following examples are given as illustrative of the process and of the products obtained:

Example 1

133 parts by weight of oleonitrile are mixed with 10 parts by weight of aluminum chloride and the mixture heated in an atmosphere of nitrogen for three hours at a temperature of 100° C., after which time the heating is continued for about six hours at 150° C. The resulting product after removal of the aluminum chloride, is a heavy, light-colored oil. 83 parts by weight of the polymerized nitriles are placed in a steel bomb, together with 5 parts by weight of metallic nickel catalyst and hydrogenated for two and one-half hours at 140° C. under a hydrogen pressure of 1350 pounds per square inch. The bomb is then cooled and the pressure released. The product is then filtered free from the suspended nickel catalyst. The product is a waxy solid insoluble in water, the salts of which form stable emulsions in water. It consists of a mixture of polyamines corresponding to the polymerized nitriles.

Example 2

175 parts by weight of nitriles prepared from the fatty acids of linseed oil are heated in an atmosphere of nitrogen for four and one-half hours at 330° C. The iodine number of the nitriles drops from 161 to 86 during this process. 150 parts of this product are then heated for eight hours at 360° C. The iodine number of this product is then 56.4. 100 parts of the final polymerized nitriles are then placed in a steel bomb and hydrogenated in the presence of 2 parts of metallic nickel catalyst for two and one-half hours at 1350 pounds per square inch hydrogen pressure. The final product consists of a semi-solid mixture of polyamines having a nitrogen content essentially equivalent to that of the original nitriles. The product can be used as an emulsifying substance in acid solutions or can be condensed with acids or aldehydes to give soft plastic masses.

Example 3

133 parts by weight of a mixture of palmito- and stearonitriles are heated with 17 parts by weight of aluminum chloride for three hours at about 100° C. and then for nine hours at about 175° C. The product after removal of the aluminum chloride and washing with water is a heavy reddish oil. 100 parts of this oil are then hydrogenated under 1000 pounds pressure at 135° C. in the presence of two parts by weight of a metallic nickel catalyst. The product is a semisolid and consists of polyamines of essentially the same nitrogen content as the nitriles used as the starting material.

Example 4

150 parts by weight of oleonitrile are heated for three hours in the presence of ten parts by weight of phosphorus. The resulting polymerized nitriles are then filtered while hot to remove the phosphorus sludge. The polymerized nitriles are then hydrogenated to polyamines as described under Example 1. The product is a reddish semi-solid showing basic properties characteristic of aliphatic amines.

Example 5

150 parts by weight of nitriles prepared from the fatty acids of cottonseed oil are polymerized in the presence of 5 parts by weight of aluminum sulfide by heating for five hours at 150° C. The aluminum sulfide sludge is then removed by filtration and the product washed with water. The polymerized nitriles are then dried and hydrogenated under 1000 pounds per square inch pressure at 130° C. in the presence of a copper chromite catalyst. The resulting polyamines are a waxy solid insoluble in water but soluble in dilute acid solutions.

In the foregoing examples we have described advantageous ways of preparing polyamines but we do wish to be limited to the exact operating conditions stated. We have shown that nitriles can be polymerized by the use of heat, in the presence or absence of catalytic materials, to give polynitriles and that the polynitriles can be hydrogenated to polyamines without depolymerization. These polynitriles result from polymerization at the olefinic bonds, or in the case of saturated nitriles by dehydrogenation followed by subsequent polymerization. Any nitrile containing ten or more carbon atoms or mixtures of such nitriles can be used as the starting material. We can, for example, start with such nitriles as lauronitrile, myristonitrile or mixtures of these nitriles with higher saturated or unsaturated nitriles. Nitriles prepared from synthetic fatty acids, such as those obtained by the oxidation of paraffin, are also operative. Likewise we do not wish to be limited to the particular conditions of hydrogenation as herein described since any of the conventional methods of hydrogenating the simple aliphatic nitriles to amines is operative for hydrogenating the polynitriles.

We do not know the chemical structure of the polyamines we obtain and, consequently, we are obliged to define our products by reference to the process of making them.

Having thus described our invention, what we claim is:

1. Aliphatic polyamines prepared by hydrogenating a polymerized aliphatic nitrile, the polymerized nitrile having at least two nitrile radicals and being the product of polymerizing an aliphatic nitrile having at least ten carbon atoms.

2. Aliphatic polyamines prepared by hydrogenating a polymerized aliphatic nitrile, the polymerized nitrile having at least two nitrile radicals and being the product of polymerizing an aliphatic nitrile having eighteen carbon atoms.

3. Aliphatic polyamines prepared by hydrogenating a polymerized aliphatic nitrile, the polymerized nitrile having at least two nitrile radicals and being the product of polymerizing an unsaturated aliphatic nitrile having eighteen carbon atoms.

4. Aliphatic polyamines prepared by hydrogenating polymerized oleonitrile.

5. Aliphatic polyamines prepared by hydrogenating polymerized stearonitrile.

6. Aliphatic polyamines prepared by hydrogenating polymerized linseed oil fatty acid nitriles.

7. The process which comprises hydrogenating a polymerized nitrile resulting from the polymerization of an aliphatic nitrile having at least ten carbon atoms.

8. The process as in claim 7 wherein the aliphatic nitrile has eighteen carbon atoms.

9. The process as in claim 7 wherein the aliphatic nitrile is unsaturated and has eighteen carbon atoms.

10. The process which comprises hydrogenating polymerized oleonitrile.

11. The process which comprises hydrogenating polymerized stearonitrile.

12. The process which comprises hydrogenating polymerized linseed oil fatty acid nitriles.

ANDERSON W. RALSTON.
ROBERT J. VANDER WAL.